No. 777,811. PATENTED DEC. 20, 1904.
E. SACHS.
CYCLE HUB.
APPLICATION FILED NOV. 10, 1903.
NO MODEL. 3 SHEETS—SHEET 1.

Witnesses Inventor
Ernst Sachs
By his Attorneys

No. 777,811. PATENTED DEC. 20, 1904.
E. SACHS.
CYCLE HUB.
APPLICATION FILED NOV. 10, 1903.
NO MODEL. 3 SHEETS—SHEET 2.
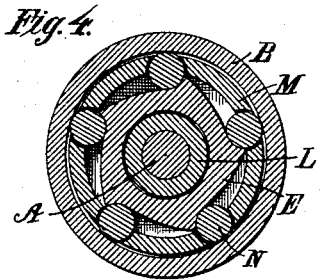
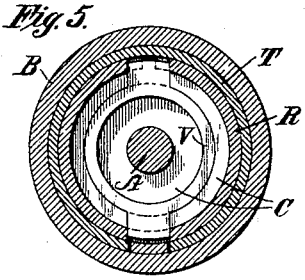
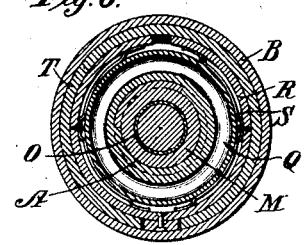
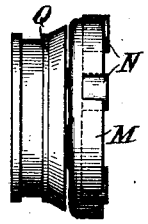
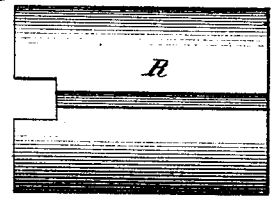
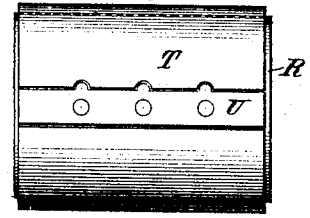
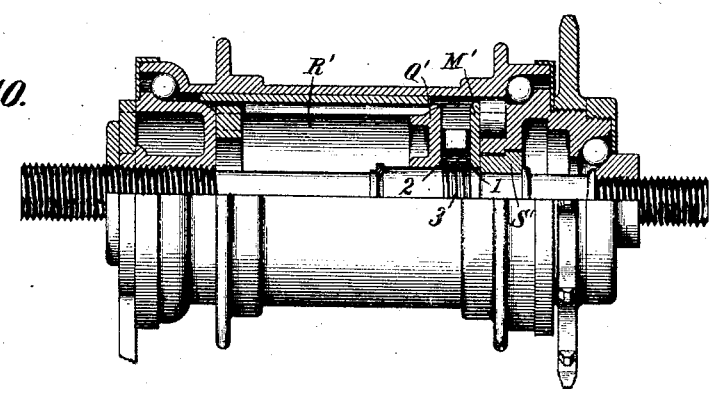
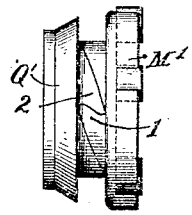

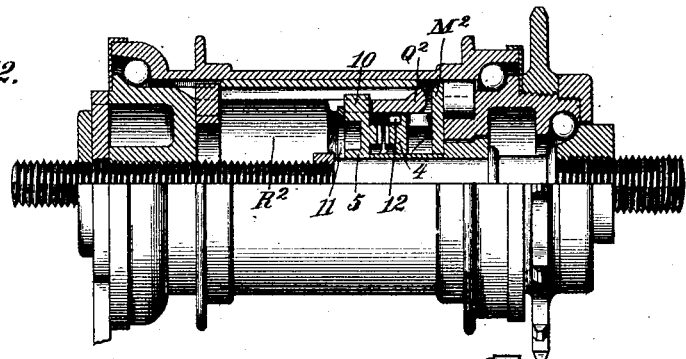
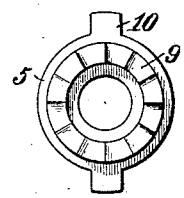
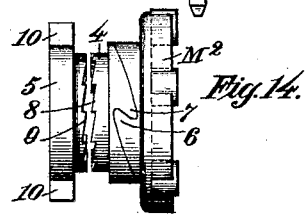
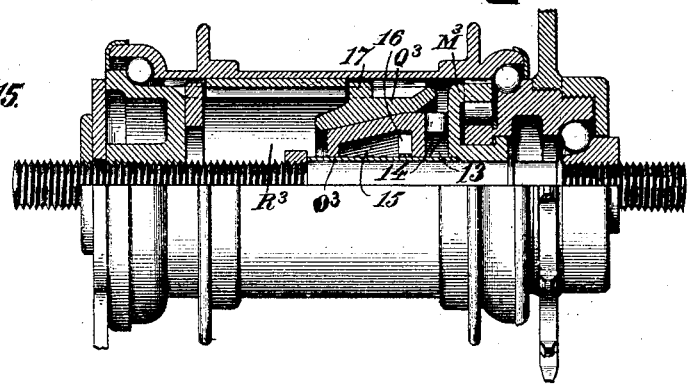
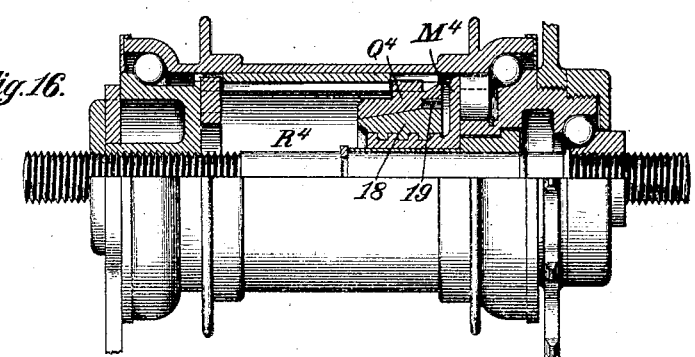

No. 777,811.   Patented December 20, 1904.

UNITED STATES PATENT OFFICE.

ERNST SACHS, OF SCHWEINFURT, GERMANY.

CYCLE-HUB.

SPECIFICATION forming part of Letters Patent No. 777,811, dated December 20, 1904.

Application filed November 10, 1903. Serial No. 180,617.

*To all whom it may concern:*

Be it known that I, ERNST SACHS, a subject of the Emperor of Germany, residing at Schweinfurt-on-the-Main, Germany, have invented certain new and useful Improvements in Cycle-Hubs; and I do hereby declare the following to be a full, clear, and exact description of the invention, such as will enable others skilled in the art to which it appertains to make and use the same.

My invention relates to cycle-hubs of that type characterized by coaster and back-pedaling-brake devices, by means of which or a forward treading of the pedals rotation or propelling of the wheel is effected, while upon holding still or resting the pedals the wheel is permitted to run freely, and upon a backward treading or pressure upon the pedals a brake is applied.

The principal object is to provide an improved and exceedingly efficient device of this character, permitting the accomplishment readily of the functions above stated, including not only the free rotation of the wheel in a forward direction, as in coasting downhill, but a free backward rotation as well, so that the machine or bicycle may be shoved backward.

The invention will first be described with reference to the accompanying drawings, which are to be taken as a part of this specification, and its distinguishing features will then be recited more particularly in the claims following the description.

Figure 1:
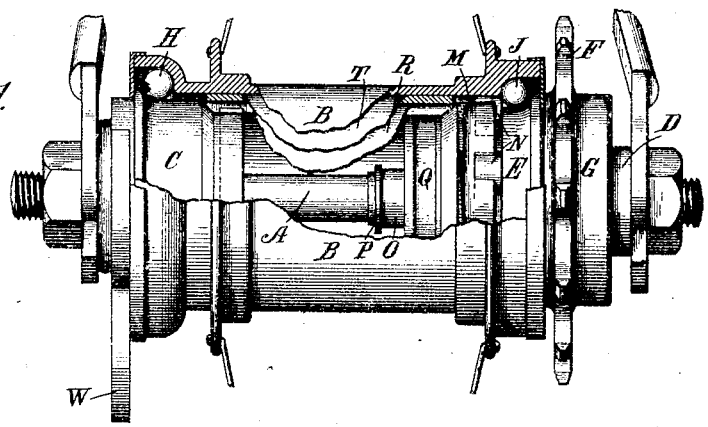
Figure 2:
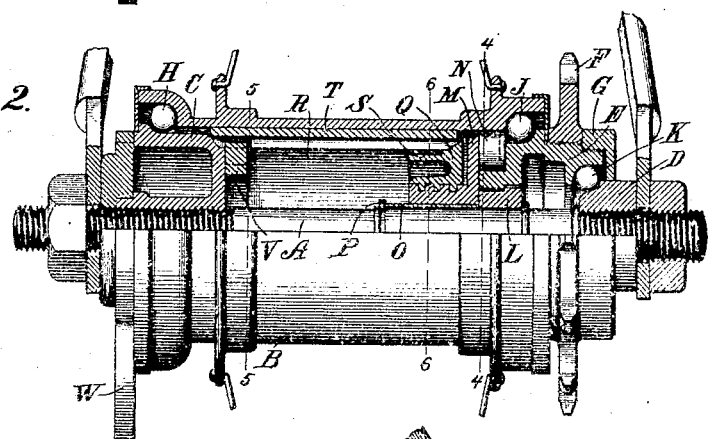
Figure 3:
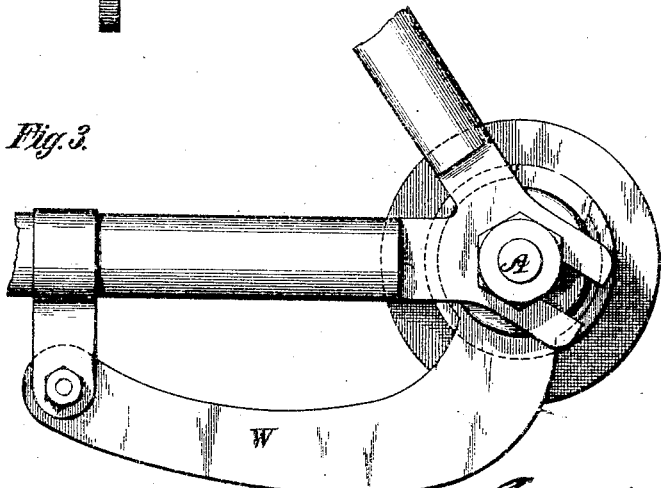

In said drawings, Figure 1 is a back or side elevation of a hub embodying my invention, with a portion of the hub-barrel broken away and some of the internal parts shown in elevation. Fig. 2 is a view of the same, half in longitudinal section and half in elevation. Fig. 3 is an end elevation looking toward the end opposite to the sprocket-wheel. Fig. 4 is a vertical cross-section taken on the line 4 4 of Fig. 2 looking in the direction of the arrow. Fig. 5 is a vertical cross-section taken on the line 5 5 of Fig. 2. Fig. 6 is a vertical cross-section on line 6 6 of Fig. 2. Fig. 7 is a detail side view of the clutch-roller-retaining ring and the coupling-ring engaged therewith. Fig. 8 is a top plan view of the flexible or expansible brake-cylinder. Fig. 9 is a bottom plan view of said cylinder, having an inclosing cylinder of brass or other soft metal or material suitable for braking, which may be renewed when its surface becomes worn. Fig. 10 is a view, half in longitudinal section and half in elevation, of a hub embodying the invention in a different form. Fig. 11 is a detail side view of the clutch-roller-retaining ring and the coupling-ring of the hub in Fig. 10. Fig. 12 is a view of a hub, half in longitudinal section and half in elevation, embodying the invention in another modification. Fig. 13 is an end view of one of the coupling parts of said hub. Fig. 14 is a detail side view of the clutch-roller-retaining ring and coupling parts of said hub. Figs. 15 and 16 are views, half in longitudinal section and half in elevation, of different hubs of other modified constructions embodying the invention.

Referring to Figs. 1 to 9, inclusive, the letter A indicates the axle or spindle of the driving-wheel, which is rigidly secured in the lugs of the rear fork or frame members of the machine in a well-known manner.

The letter B denotes the hub proper or rotary hub-barrel; C, a bearing-cone at the left-hand end of the hub; D, a bearing-cone at the opposite or right-hand end; E, a rotary ring or sleeve, herein termed the "propelling-ring," interposed between the cone D and hub-barrel B, and F the driving sprocket-wheel, which is rigidly mounted on the ring or sleeve E and which is connected, by the usual driving-chain, with a sprocket-wheel on the crank-shaft, the latter not being shown in the drawings. A bevel-gear would of course take the place of said sprocket-wheel in a chainless bicycle. In the construction illustrated the sprocket-wheel consists of an annular toothed member internally threaded and screwed on an externally-threaded part of the propelling-ring E against a shoulder on the latter, while a ring or annular casing G is screwed on said ring or sleeve against the outer face of the sprocket-wheel, thus holding the latter rigidly in place. The sprocket may of course be formed integrally with the propelling-ring, though the construction shown is preferred. The hub-barrel when rotating freely or independently of the sprocket-wheel turns on suitable ball-bearings H and J; but when driven by and rotating with the sprocket-wheel it turns on bearings H and K. A hardened bearing-ring L on the axle guides the propelling-ring E on one side and prevents lateral movement thereof, said bearing-ring and propelling-ring having suitable coöperating shoulders for this purpose. Forward movement or driving of the wheel is effected by means of a ball or roller clutch mechanism between the propelling-ring E and the hub-barrel, in this instance rollers N being employed.

In Fig. 4 the portion of the propelling-ring around which the rollers are arranged has a series of cam-surfaces which are deep or recessed at their forward ends and gradually inclined upwardly toward their rear ends. The rollers N are arranged on said cam-surfaces, and when the wheel is propelled they become wedged between them and the interior of the hub-barrel. These rollers are inserted in a retaining-ring M, which has a tubular extension inclosing the axle and provided with a right-hand thread, which engages a female thread in a coupling-ring or brake-actuating member Q. A hardened tube or casing O is preferably fitted on the axle as a bearing for said retaining-ring to prevent wear of the axle, and said tube or casing may be held in place by an elastic ring P, secured in a groove in the axle. Within the hub-barrel is a stationary longitudinally-split flexible or expansible cylinder R, having its ends interiorly beveled. It is the expansion of this cylinder against the interior of the hub-barrel which applies the brake. One end of said cylinder rests against an annular beveled surface on the bearing-cone C, while its opposite end coacts with an outer beveled edge or flange of the coupling-ring or brake-actuating member Q. A friction-spring S is arranged between the coupling-ring Q and the cylinder R, whose friction is slightly greater than that of the threaded connection between the parts R and M. Said spring is preferably connected to a permanently-attached part of the hub—as, for instance, the spindle—in this case being attached to the cylinder R. Surrounding the cylinder R is preferably a similar cylinder T, of soft material, such as brass or the like, suitable for braking purposes, which may be renewed when its braking-surface becomes worn. To hold the two cylinders in proper relations, a longitudinal key U may be secured to one cylinder, fitted in a slot in the other, and provided with lugs or projections fitting in notches in the latter. (See Figs. 8 and 9.) This prevents the cylinder T from moving laterally as well as from turning when the brake is applied, as hereinafter explained. The cylinder R may be held stationary and prevented from turning when the brake is applied by means of a ring V, inclosed within the inner end of the bearing-cone C and having lugs engaging notches in the inner annular rim of said bearing-cone as well as notches in the cylinder. (See Figs. 2, 5, and 7.) To insure against any possible turning of the bearing-cone when the brake is applied, an arm W may be fastened to the frame of the machine by a suitable bracket, and said arm may be rigidly connected to the bearing-cone, as by lugs engaging notches in the outer annular rim of the latter, as shown more clearly in Fig. 3.

Driving of the wheel, free rotation thereof, and braking are effected in the following manner: On a forward treading of the pedals the sprocket-wheel, and with it the propelling-ring E, rotate in the direction of the arrow in Fig. 4, and thereby the clutch-rollers N, and with them their retaining-ring M, are turned till the coupling-ring or brake-actuating member Q, which is prevented from turning by the friction-spring S, moves to the right against the inner face of the retaining ring M. A close connection between Q, M, and N is thus brought about. As the rotation of the propelling-ring E continues the friction-spring slightly retards the turning of these parts Q, M, and N, and in this way the rollers are caused to rise up their cam-surfaces, becoming wedged between them and the inner surface of the hub-barrel, thus effecting forward rotation of the hub and propelling of the wheel.

When the pedals are held at rest, the sprocket-wheel and the propelling-ring also remain stationary. The hub-barrel in turning carries the clutch-rollers into the recesses or deeper forward ends of the cam-surfaces, and thus the hub-barrel runs entirely free on its bearings H and J without contact with the clutch-rollers. In this way the lightest imaginable free rotation is obtainable, as there are no friction-springs nor any cylindrical friction that might hinder the rotation of the hub-barrel. Should the hub-barrel be rotated backwardly, or in an opposite direction to the arrow in Fig. 4, the clutch-roller-retaining ring, with its rollers, is held against rotation by the friction-spring S, so that the rollers cannot rise up their cams. The result is that the wheel can be pushed backward as well as forward. In most ball or roller clutch mechanisms heretofore known the clutch parts (balls, rollers, &c.) have been influenced by means of springs to rise up their cam-surfaces and come in contact with the hub-barrel, even when at the release of the pedals a free rotation is permitted. Such constructions permit only a free forward rotation and not a backward rotation of the wheel, and so unless an additional clutch mechanism or other device is provided the wheel cannot be shoved backward. On the other hand, in the hub now under consideration during free forward rotation of the hub-barrel the clutch-rollers rest in the deeper or recessed ends of the cam-surfaces on E, while during backward rotation of the hub-barrel the friction-spring S prevents a rising of the rollers up their cam-surfaces, and thus the hub-barrel can rotate freely on its bearings in both directions.

The brake is applied by a backward treading of the pedals. The sprocket-wheel and the propelling-ring are turned backward or in an opposite direction to the arrow in Fig. 4. The clutch-rollers N are thus engaged in the recesses of their cam-surfaces and carried backward, and in so moving they also turn the retaining-ring M in a backward direction. As the friction of the spring S is greater than that of the screw-threads between M and Q, a shifting of the coupling or brake-actuating member, which is prevented from turning, takes place toward the left, and as such shifting progresses the friction between the bevel-faces of R and Q becoming greater still further prevents Q from turning. On account of the engagement between the interiorly-beveled ends of the cylinder R on the bevels of the parts C and Q said cylinder expands or spreads circumferentially, thus also expanding the outer cylinder T, which slides against the inner surface of hub-barrel and causes a braking of the same. In proportion to the amount of pressure exerted upon the pedals a more or less heavy braking action is obtained. The right-hand face of the clutch-roller-retaining ring M bears against the hardened ring L, which thus prevents an axial pressure on the hub-bearings when the brake is applied.

The modified construction shown in Figs. 10 and 11 is similar to that described, except in the following particulars: Instead of the roller-clutch-retaining ring having a tubular part screwed into the brake-actuating member the retaining-ring, here designated by the symbol M', has on its left-hand face a series of cam-teeth 1, which engage a series of corresponding teeth 2 on the member Q'. The friction-spring between the member Q' and the braking-cylinder R' is dispensed with, and a spiral compression-spring 3, arranged on the axle between the parts M' and Q', presses the part M' close to the hardened ring S', while it also presses the member Q' to the left, and thus effects a friction between the bevel-faces of R' and Q'. Propelling and free backward and forward rotation of the hub are effected in the same manner already explained by virtue of the slight friction existing between the spring 3 and retaining-ring M'. When the pedals are turned or pressed backward to apply the brake, the teeth 1 ride backward on the outwardly-inclined teeth 2, and thus cause a shifting of the part Q', since the friction between the beveled surfaces of Q' and R' is greater than the gliding friction between the teeth 1 and 2, and by such shifting the brake is operated.

Referring to the construction shown in Figs. 12, 13, and 14, the symbol $M^2$ designates the clutch-roller-retaining ring; $Q^2$, the brake-actuating member, having a beveled right-hand edge or rim; $R^2$, the brake-cylinder, and 4 denotes a ring adjacent to the retaining-ring, interposed between the same and a disk or ring 5, which is connected to the member $Q^2$. The retaining-ring $M^2$ has on its left-hand face cam-teeth 6, which engage corresponding teeth 7 on one side of the ring 4. On the other side of the latter member are also teeth 8, projecting oppositely to the teeth 6, which confront teeth 9 on the disk 5. The said disk 5 has on its edge lugs 10, which engage corresponding recesses or notches in the part $Q^2$ and also in the cylinder $R^2$, whereby said $Q^2$ and 5 are prevented from turning. Dislocation of the disk 5 within the member $Q^2$ when the brake is applied is prevented by means of a spring-ring 11. A spring 12 between $Q^2$ and 4 establishes a friction between these parts. A backward treading upon the pedals causes the teeth 6 to rise against teeth 7, and thus effect a shifting of the ring 4, which is held from turning by friction-spring 12, and by the engagement of the smaller teeth 8 and 9 said ring is further held from turning and causes a shifting of the disk 5, and with it the part $Q^2$, thus applying the brake in the manner already set forth. In Fig. 12 the hardened wearing tube or casing $O^7$ is retained in place by a nut screwed on the spindle instead of by an elastic ring, as in Fig. 2.

In Fig. 15 the clutch-roller-retaining ring $M^3$ is furnished with cam-teeth 13, which engage corresponding teeth on a cone 15. A spring 16, arranged between 15 and the casing $O^3$, effects a slight friction between these parts. Inclosing the cone 15 is the brake-operating member $Q^3$, tapered or conical interiorly to fit the cone and having a beveled right-hand edge or rim to coact with the beveled inner end of the braking-cylinder $R^3$. The member $Q^3$ is prevented from turning by engagement of lugs 17 thereon with recesses in the cylinder $R^3$. When the pedals are treaded backward, the teeth 13 ride against teeth 14, thus shifting the cone 15, as the friction of the spring 16 is greater than the gliding friction between the teeth. The member $Q^3$ is also shifted, and thus the braking is accomplished.

In Fig. 16 the retaining-ring $M^3$ has a tubular extension provided with a right-hand thread screwed into a female thread in a cone 18. Inclosing cone 18 is the brake-cylinder-operating member $Q^4$, which is connected to the brake-cylinder $R^4$, as by a lug and notch, in such manner as to keep from turning, while it can slide back and forth. A spring 19, placed between 18 and $Q^4$, effects a slight friction between these parts. A backward treading of the pedals causes a backward turning of $M^4$, while the friction caused by 19 being greater than that between the threads $M^4$ and 18 the part 18 does not turn, but shifts to the left, likewise shifting the member $Q^4$ and applying the brake.

The invention is capable of further modifications in details of construction and arrangement and embodiment in other forms than that herein represented. The propelling-ring may of course be formed integrally with the sprocket, or the clutch may be otherwise arranged to lock the sprocket to the hub-barrel, and different features of the invention are capable of application or different relations.

Having thus fully described my invention, what I claim as new, and desire to secure by Letters Patent of the United States, is—

1. The combination with the hub proper, of a sprocket or coaxial propelling member, a clutch mechanism between these two parts consisting of an annular series of cam-surfaces on one part having deeper or recessed front ends and upwardly or rearwardly inclined toward their rear ends and balls or rollers arranged between said cam-surfaces and the other part, a retaining-ring in which said balls or rollers are spaced and held, a friction-brake for the hub, an actuating member therefor which is connected to and normally turns with the retaining-ring but applies the brake when held against turning on reverse turning of said retaining-ring, and a friction-spring acting against said brake-actuating member and resisting rotation thereof, whereby turning of the retaining-ring with its balls or rollers is normally retarded, insuring operation of the clutch on forward rotation of the propelling member and permitting free reverse rotation of the hub, while said brake-actuating member is held against turning on reverse movement of said propelling member and hence caused to apply the brake.

2. The combination with the hub proper, of a sprocket or coaxial propelling member, a ball or roller clutch mechanism adapted on forward rotation of said member to lock it with the hub and on holding said member at rest to permit free rotation of the hub, a friction-brake, an actuating member therefor which normally rotates with the propelling member but which when held against turning is adapted to be shifted to apply the brake by a reverse movement of the propelling member, and a spring which positively effects the operation of the clutch on forward rotation of the propelling member and which holds the brake-actuating member against turning on reverse movement of said propelling member.

3. The combination with the hub proper, of a sprocket or coaxial propelling member, a ball or roller clutch mechanism between said parts, a retaining-ring for the balls or rollers, a friction-brake, an actuating member therefor, a connection between said actuating member and said retaining-ring whereby the former is forwardly rotated with the latter but may be shifted to apply the brake when the latter is independently turned reversely, and means exerting friction on said brake-actuating member greater than the friction contact between it and said retaining-ring.

4. The combination with the hub proper, of a sprocket or coaxial propelling member, a ball or roller clutch mechanism between said parts, a retaining-ring for the balls or rollers, a friction-brake, an annular brake-actuating member, said retaining-ring having a threaded connection with said brake-actuating member, and means exerting friction on said brake-actuating member greater than the friction between the threads of said connection.

5. The combination with the hub proper, of a sprocket or coaxial propelling member, a ball or roller clutch mechanism between said parts, a retaining-ring for the balls or rollers having a tubular threaded part, a fixed split flexible brake-cylinder, an annular actuating member adapted on shifting to force said brake-cylinder in contact with the hub-barrel, said brake-actuating member having a female threaded part engaged by the threaded part of the retaining-ring, and a friction-spring acting against said brake-actuating member exerting greater friction than that existing between the said screw-threads.

6. The combination with the axle, right and left bearing-cones, and hub-barrel, of the sprocket or driving wheel having a bearing on the right cone and having a propelling ring or sleeve rigid therewith extending within the hub-barrel, the latter having a free-running bearing on the left cone and propelling-ring, a ball or roller clutch mechanism between said propelling-ring and hub-barrel, a retaining-ring therefor, a fixed split expansible brake-cylinder within the hub having interiorly-beveled ends one of which bears against an annular bevel on the left bearing-cone, a brake-actuating member having an annular bevel coacting with the opposite beveled end of said brake-cylinder, a connection between said brake-actuating member and the retaining-ring whereby they rotate forwardly together but the former when held against rotation may be shifted by reverse rotation of the latter to expand the brake-cylinder against the inner surface of the hub-barrel, a friction-spring exerting greater friction on the brake-actuating member than that existing between said member and the retaining-ring, and a ledge or collar as S on the axle guiding the propelling-ring and forming an abutment on the right face of the retaining-ring to prevent axial pressure on the bearings when the brake is applied.

7. A split flexible brake-cylinder having a similar cylinder of soft braking material fitted thereto, one of said cylinders having a longitudinal key fitted in a slot in the other and said key having lugs fitting in notches in the latter cylinder, whereby the cylinders are prevented either from turning or moving lengthwise relatively to each other.

In testimony whereof I affix my signature in presence of two witnesses.

ERNST SACHS.

Witnesses:
R. VOIGTLAÜDER,
RUDOLPH FRICKE.